US010285031B2

(12) United States Patent
Toya et al.

(10) Patent No.: US 10,285,031 B2
(45) Date of Patent: May 7, 2019

(54) METHOD FOR CONTROLLING INFORMATION TERMINAL AND INFORMATION TERMINAL

(71) Applicant: Panasonic Intellectual Property Management Co., Ltd., Osaka (JP)

(72) Inventors: Shoichi Toya, Hyogo (JP); Yutaka Iwahori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/219,408

(22) Filed: Jul. 26, 2016

(65) Prior Publication Data
US 2017/0064495 A1    Mar. 2, 2017

(30) Foreign Application Priority Data
Aug. 28, 2015   (JP) .................. 2015-169807

(51) Int. Cl.
*H04W 4/80* (2018.01)
*H04L 29/08* (2006.01)
*H01M 10/42* (2006.01)

(52) U.S. Cl.
CPC .............. *H04W 4/80* (2018.02); *H04L 67/12* (2013.01); *H01M 2010/4271* (2013.01)

(58) Field of Classification Search
CPC combination set(s) only.
See application file for complete search history.

(56) References Cited

U.S. PATENT DOCUMENTS

| 2011/0125040 A1* | 5/2011 | Crawford | A61B 5/0006 600/509 |
| 2011/0181106 A1* | 7/2011 | Kim | H04W 52/0277 307/9.1 |
| 2011/0202218 A1* | 8/2011 | Yano | B60L 3/12 701/22 |
| 2012/0123633 A1* | 5/2012 | Uyeki | B60L 3/12 701/33.2 |
| 2013/0116860 A1* | 5/2013 | Kawai | B60R 25/24 701/2 |
| 2013/0127611 A1* | 5/2013 | Bernstein | G08B 21/18 340/455 |

(Continued)

FOREIGN PATENT DOCUMENTS

| JP | 2001-306961 | 11/2001 |
| JP | 2008-250786 | 10/2008 |

*Primary Examiner* — Junpeng Chen
(74) *Attorney, Agent, or Firm* — Greenblum & Bernstein, P.L.C.

(57) ABSTRACT

A method for controlling an information terminal according to one aspect of the present disclosure includes: when a user of the information terminal uses the electric mobile body, acquiring information indicative of a state of an electric storage device mounted in an electric mobile body from the electric storage device via a first communicator that is a communicator of the information terminal and that performs near field communication with the electric storage device; and transmitting the information indicative of the state of the electric storage device to a server device via a second communicator that is a communicator of the information terminal and that communicates with the server device.

18 Claims, 13 Drawing Sheets

(56) References Cited

U.S. PATENT DOCUMENTS

| | | | | |
|---|---|---|---|---|
| 2013/0165137 A1* | 6/2013 | Fong | ............... | G01S 19/16 455/456.1 |
| 2013/0274955 A1* | 10/2013 | Rosenbaum | ............ | G06F 17/00 701/1 |
| 2014/0073254 A1* | 3/2014 | Ichihara | ............... | G07C 5/008 455/41.2 |
| 2014/0214242 A1* | 7/2014 | Seo | ............... | B60L 11/1861 701/2 |
| 2014/0225620 A1* | 8/2014 | Campbell | ........... | B60L 11/1838 324/426 |
| 2014/0379285 A1* | 12/2014 | Dempsey | ........... | G01R 31/3689 702/63 |
| 2015/0160019 A1* | 6/2015 | Biswal | ............... | G01C 21/26 701/1 |
| 2015/0222708 A1* | 8/2015 | Addepalli | ............ | H04W 4/046 709/217 |
| 2016/0006085 A1* | 1/2016 | Toya | ............... | H01M 10/48 429/90 |
| 2016/0375788 A1* | 12/2016 | Liu | ............... | B60L 11/1861 701/22 |

\* cited by examiner

FIG. 6

| USE STATE | CRITERIA ON WHICH USE STATE IS DETERMINED |
|---|---|
| START OF USE | (1) SWITCH OF ELECTRIC MOBILE BODY IS TURNED ON<br>(2) LOAD ELECTRIC CURRENT INCREASES TO BECOME HIGHER THAN PREDETERMINED VALUE<br>(3) CONTINUOUS VIBRATION STARTS<br>(4) REMAINING BATTERY LEVEL STARTS TO DECREASE |
| DURING USE | (1) SWITCH OF ELECTRIC MOBILE BODY IS ON<br>(2) LOAD ELECTRIC CURRENT IS HIGHER THAN PREDETERMINED VALUE<br>(3) CONTINUOUS VIBRATION IS BEING MAINTAINED<br>(4) REMAINING BATTERY LEVEL IS DECREASING |
| END OF USE | (1) SWITCH OF ELECTRIC MOBILE BODY IS TURNED OFF<br>(2) LOAD ELECTRIC CURRENT DECREASES TO BECOME EQUAL TO OR LOWER THAN PREDETERMINED VALUE<br>(3) CONTINUOUS VIBRATION STOPS<br>(4) REMAINING BATTERY LEVEL STOPS DECREASING |

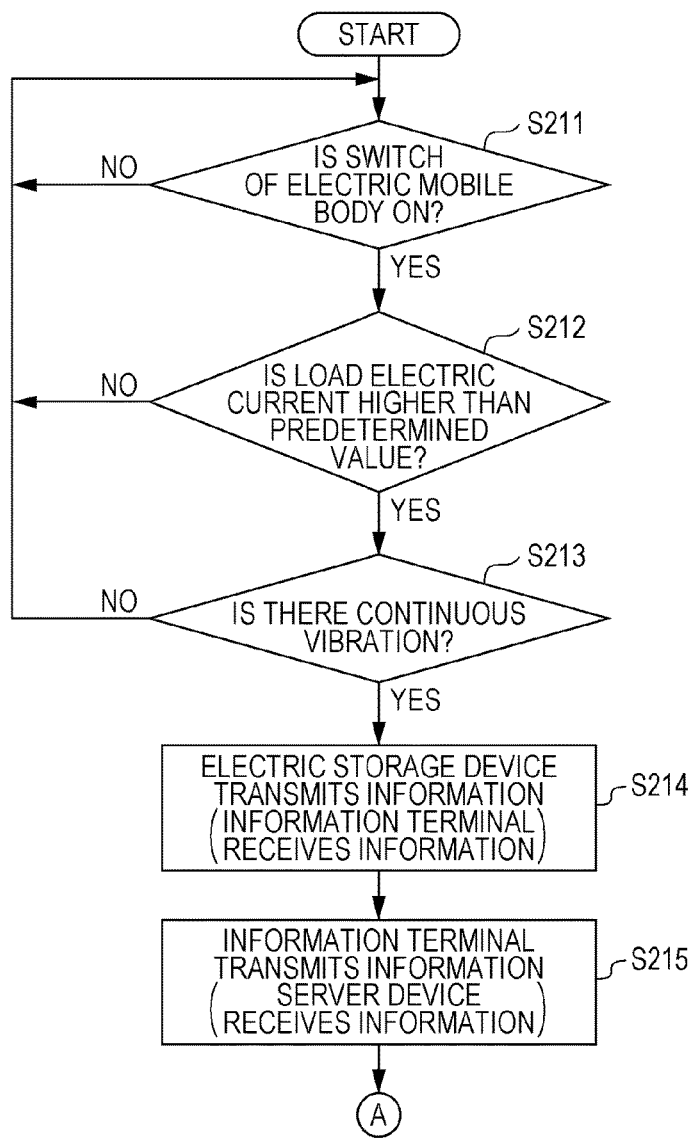

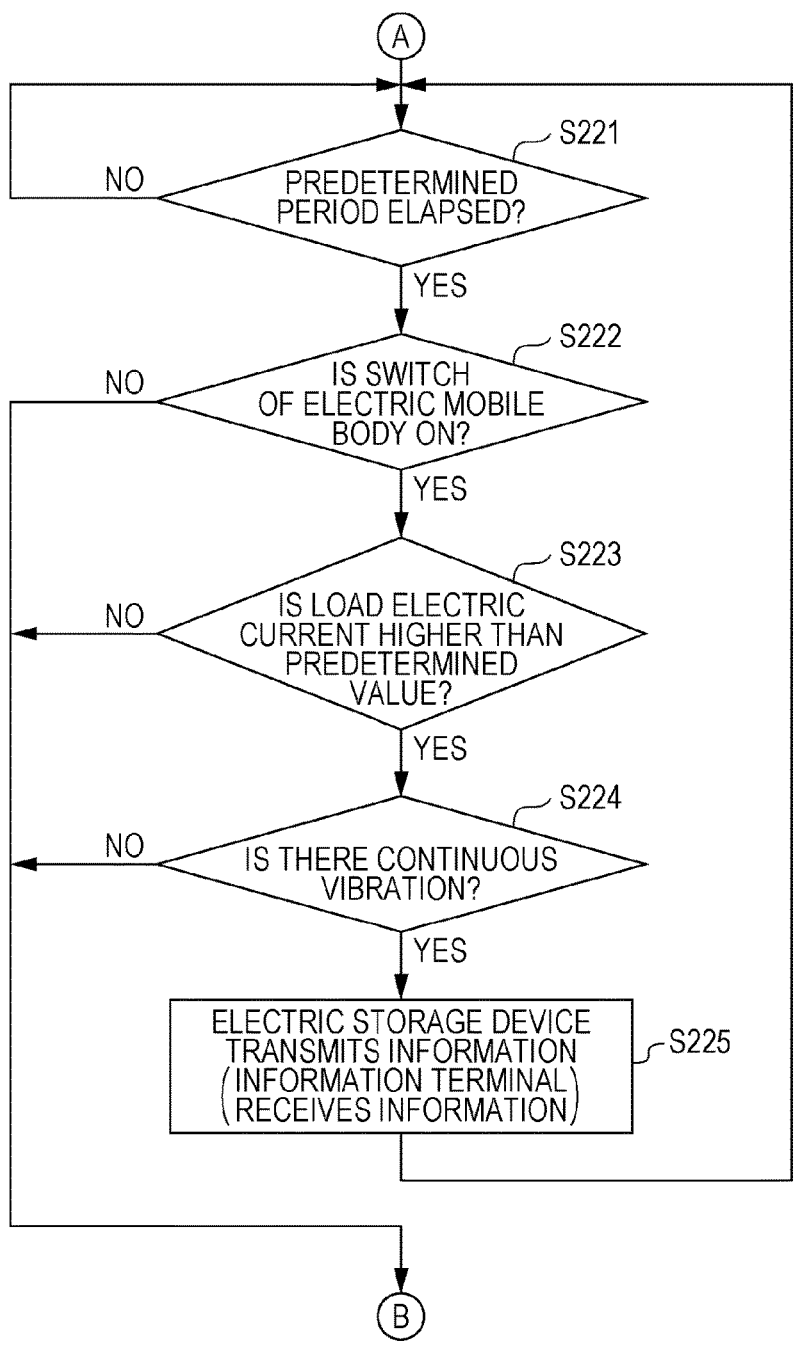

FIG. 11

| TYPE OF DETECTION UNIT | CRITERIA ON WHICH IT IS DETERMINED WHETHER OR NOT INFORMATION TERMINAL IS MOVING |
|---|---|
| LOCATION SENSOR (GPS) | CONTINUOUS MOVEMENT OF LOCATION |
| VIBRATION SENSOR | CONTINUOUS VIBRATION |
| ACCELERATION SENSOR | CONTINUOUS CHANGE OF ACCELERATION |
| GEOMAGNETIC SENSOR | CONTINUOUS MOVEMENT OF LOCATION |

METHOD FOR CONTROLLING INFORMATION TERMINAL AND INFORMATION TERMINAL

BACKGROUND

1. Technical Field

The present disclosure relates to a method for controlling an information terminal, an information terminal, and the like that are for managing an electric storage device.

2. Description of the Related Art

Conventionally, a rental system that makes it possible to rent a battery pack or the like to and from a user at any place has been proposed (Japanese Unexamined Patent Application Publication No. 2001-306961). Furthermore, a secondary battery recycling system that provides service of offering a charged secondary battery to a user has been proposed (Japanese Unexamined Patent Application Publication No. 2008-250786).

However, for example, there is a possibility that a lifespan and an abnormality of an electric storage device that has been rented are not noticed because of improper management of a state of the electric storage device.

SUMMARY

One non-limiting and exemplary embodiment provides a method for controlling an information terminal, an information terminal, and the like for properly managing a state of an electric storage device.

In one general aspect, the techniques disclosed here feature a method, including: when a user of the information terminal uses the electric mobile body, acquiring information indicative of a state of an electric storage device mounted in an electric mobile body from the electric storage device, via a first communicator that is a communicator of an information terminal and that performs near field communication with the electric storage device; and transmitting the information indicative of the state of the electric storage device to a server device via a second communicator that is a communicator of the information terminal and that communicates with the server device.

According to the method, the information terminal, and the like, a state of an electric storage device is properly managed.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is an explanatory view for explaining criteria on which a use state is determined in the embodiment;

FIG. 7 is a flow chart illustrating operations at the time of the start of use in the embodiment;

FIG. 8 is a flow chart illustrating operations during use in the embodiment;

FIG. 11 is an explanatory view for explaining criteria on which it is determined whether or not the information terminal is moving in the embodiment;

DETAILED DESCRIPTION

Figure 1:
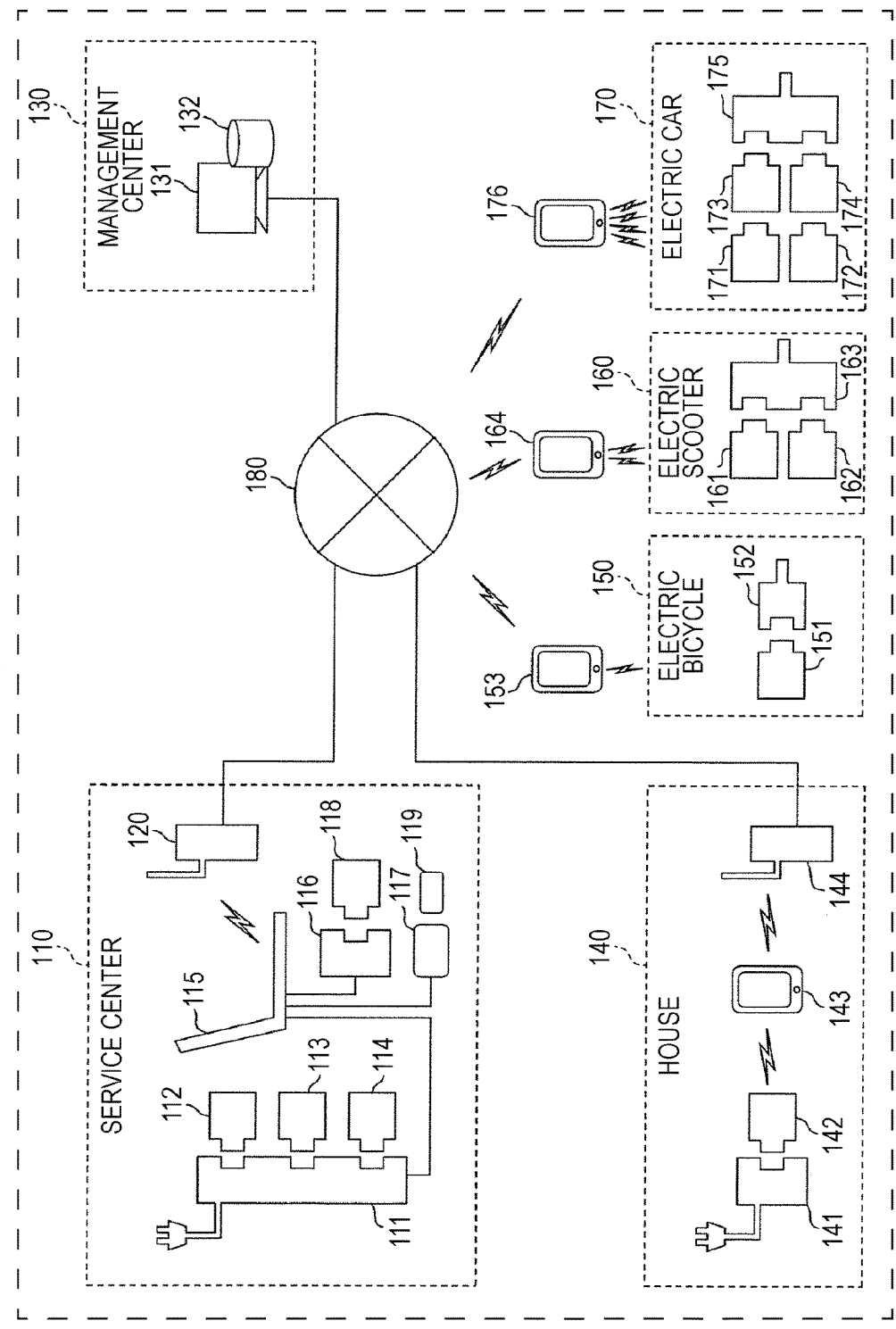
FIG. 1 is a schematic view illustrating a system environment in an embodiment.

Underlying Knowledge Forming Basis of the Present Disclosure

The inventor of the present invention found the following problems concerning rent of an electric storage device described in Description of the Related Art. The problems are specifically described below.

In recent years, an electric mobile body such as an electric bicycle, an electric scooter, and an electric car is starting to become popular. An electric storage device is used in such an electric mobile body. However, a high-capacity electric storage device used in an electric mobile body is often expensive. In view of this, electric storage device rental systems such as the ones described in Japanese Unexamined Patent Application Publication No. 2001-306961 and Japanese Unexamined Patent Application Publication No. 2008-250786 have been proposed.

However, for example, there is a possibility that a lifespan and an abnormality of an electric storage device that has been rented are not noticed because of improper management of a state of the electric storage device. In order to properly manage the state of such an electric storage device, it is required that information indicative of the state of the electric storage device be properly collected.

In view of this, a method to a first aspect of the present disclosure includes, when a user of the information terminal uses the electric mobile body, acquiring information indicative of a state of an electric storage device mounted in an electric mobile body from the electric storage device, via a first communicator that is a communicator of an information terminal and that performs near field communication with the electric storage device; and transmitting the information indicative of the state of the electric storage device to a server device via a second communicator that is a communicator of the information terminal and that communicates with the server device.

With the arrangement, information indicative of the state of an electric storage device is transmitted to a server device via an information terminal when an electric mobile body is used. This reduces occurrence of a situation where a user continues to use the electric storage device without accumulation of a history of the information indicative of the state of the electric storage device in the server device. It is therefore possible to properly manage the state of the electric storage device. Furthermore, even in a case where the electric storage device itself includes no communication unit that directly communicates with the server device, the information indicative of the state of the electric storage device is transmitted to the server device. Furthermore, when the electric mobile body is used, it can be assumed that the electric storage device and the information terminal are close to each other enough to perform near field communication with each other. Accordingly, the information indicative of the state of the electric storage device is properly transmitted to the server device via the information terminal.

Note that "when the electric mobile body is used" means, for example, "during a period from the start of use of the electric mobile body to the end of use of the electric mobile body". The expression "start of use" as used herein also encompasses a case where the information terminal which the user carries and the electric storage device are within a communication range in a case the user tries to start using the electric mobile body. For example, the expression "start of use" encompasses a case where the user comes close to the electric mobile body in order to start using the electric mobile body and is within the communication range although the electric mobile body has not been activated yet. The expression "end of use" as used herein also encompasses a case where the information terminal which the user carries and the electric storage device are within a communication range in a case the user tries to end using the electric mobile body. For example, the expression "end of use" encompasses a case where the user is within the communication range although the electric mobile body has already stopped. In other words, "when the electric mobile body is used" means "when the information terminal which the user carries is within a range in which the information terminal is communicable with the electric storage device at the time of use of the electric mobile body".

In the method for controlling an information terminal according to the first aspect, for example, a method for controlling an information terminal according to a second aspect of the present disclosure may be arranged such that the information indicative of the state of the electric storage device is acquired via the first communicator at a time of start of use of the electric mobile body.

With the arrangement, information indicative of a state of the electric storage device at the time of the start of use of the electric storage device is transmitted to the server device via the information terminal. It is therefore possible to collect the information indicative of the state of the electric storage device at the time of the start of use of the electric storage device.

In the method for controlling an information terminal according to the first aspect, for example, a method for controlling an information terminal according to a third aspect of the present disclosure may be arranged such that the information indicative of the state of the electric storage device is acquired via the first communicator at a time of end of use of the electric mobile body.

With the arrangement, information indicative of a state of the electric storage device at the time of the end of use of the electric storage device is transmitted to the server device via the information terminal. It is therefore possible to collect the information indicative of the state of the electric storage device at the time of the end of use of the electric storage device.

In the method for controlling an information terminal according to any one of the first through third aspects, for example, a method for controlling an information terminal according to a fourth aspect of the present disclosure may be arranged to further include notifying the user that the information indicative of the state of the electric storage device is being acquired.

With the arrangement, it is possible to confirm that the information indicative of the state of the electric storage device is being acquired.

In the method for controlling an information terminal according to the first aspect, for example, a method for controlling an information terminal according to a fifth aspect of the present disclosure may be arranged such that the information indicative of the state of the electric storage device is regularly acquired via the first communicator during use of the electric mobile body; and among the information regularly acquired via the first communicator, information acquired via the first communicator at a point in time nearest to end of use of the electric mobile body is transmitted to the server device via the second communicator after the end of use of the electric mobile body.

With the arrangement, it is possible to collect the information indicative of the state of the electric storage device immediately before the end of use of the electric storage device.

In the method for controlling an information terminal according to any one of the first through fifth aspects, for example, a method for controlling an information terminal according to a sixth aspect of the present disclosure may be arranged to further include activating near field communication between the information terminal and the electric storage device when the user of the information terminal uses the electric mobile body.

With the arrangement, the information terminal is permitted to perform near field communication with the electric storage device when the user of the information terminal uses the electric mobile body. It is therefore possible to properly collect the information indicative of the state of the electric storage device.

In the method for controlling an information terminal according to the sixth aspect, for example, a method for controlling an information terminal according to a seventh aspect of the present disclosure may be arranged to further include deactivating near field communication between the information terminal and the electric storage device after the information indicative of the state of the electric storage device is acquired.

With the arrangement, after the information indicative of the state of the electric storage device is acquired, the information terminal is prohibited from performing near field communication with the electric storage device. This makes it possible to properly restrict near field communication.

In the method for controlling an information terminal according to any one of the first through seventh aspects, for example, a method for controlling an information terminal according to an eighth aspect of the present disclosure may be arranged to further include displaying, on a display screen of the information terminal, information that requests activation of near field communication with the electric storage device when the user of the information terminal uses the electric mobile body; and activating near field communication between the information terminal and the electric storage device by an operation of the user.

With the arrangement, when the user of the information terminal uses the electric mobile body, the user is prompted to activate near field communication, and the information terminal is permitted to perform near field communication with the electric storage device. It is therefore possible to properly collect the information indicative of the state of the electric storage device.

A non-transitory computer-readable recording medium storing a program according to a ninth aspect of the present disclosure may be, for example, a non-transitory computer-readable recording medium storing a program for causing the information terminal to execute the method for controlling an information terminal according to the first aspect of the present disclosure.

With the arrangement, a method for controlling an information terminal is realized by a program. By execution of the program, the information indicative of the state of the electric storage device is transmitted to the server device, and the state of the electric storage device is properly managed.

A information terminal according to a tenth aspect of the present disclosure includes a first communicator that performs near field communication with an electric storage device; a second communicator that communicates with a server device; and a controller that acquires information indicative of a state of the electric storage device from the electric storage device via the first communicator when a user of the information terminal uses an electric mobile body and then transmits the information indicative of the state of the electric storage device to the server device via the second communicator.

With the arrangement, information indicative of the state of an electric storage device is transmitted to a server device via an information terminal when an electric mobile body is used. This reduces occurrence of a situation where a user continues to use the electric storage device without accumulation of a history of the information indicative of the state of the electric storage device in the server device. It is therefore possible to properly manage the state of the electric storage device. Furthermore, even in a case where the electric storage device itself includes no communication unit that directly communicates with the server device, the information indicative of the state of the electric storage device is transmitted to the server device. Furthermore, when the electric mobile body is used, it can be assumed that the electric storage device and the information terminal are close to each other enough to perform near field communication with each other. Accordingly, the information indicative of the state of the electric storage device is properly transmitted to the server device via the information terminal.

It should be noted that general or specific embodiments may be implemented as a system, a device, a method, an integrated circuit, a computer program, a computer-readable non-transitory storage medium such as a CD-ROM, or any selective combination thereof.

An embodiment is specifically described below with reference to the drawings. Note that the embodiment described below illustrates a general or specific example. Numerical values, shapes, materials, constituent elements, the positions of the constituent elements, the way in which the constituent elements are connected, steps, the order of steps, and the like are examples and do not limit the present disclosure. Among constituent elements in the embodiment described below, constituent elements that are not described in independent claims that indicate the highest concepts are described as optional constituent elements.

Furthermore, ordinal numbers such as "first", "second", and "third" may be added to constituent elements as needed. In the following description, communication utilizing a wireless communication technology is called wireless communication. That is, even in a case where wired communication is partially used, communication including wireless communication and utilizing a wireless communication technology is sometimes referred to as wireless communication.

Embodiment

FIG. 1 is a schematic view illustrating a system environment in the present embodiment. In FIG. 1, a system environment for renting an electric storage device is illustrated.

In a service center 110, an electric storage device is rented to a user or returned from a user. A user of an electric storage device rents the electric storage device in the service center 110 and returns the electric storage device in the service center 110. A charging locker 111, an information processing device 115, an inspection device 116, a card reader 117, a router device 120, and the like are installed in the service center 110.

The charging locker 111 is a locker for charging an electric storage device. The charging locker 111 charges an electric storage device by using electric power fed from an electric power system.

Electric storage devices 112 through 114 each are an example of an electric storage device of the present disclosure and is an electric storage device to be rented to a user. The electric storage devices 112 through 114 are stored in the charging locker 111 and are charged.

The information processing device 115 is a device that communicates with a server device 131 of a management center 130 and checks a state of an electric storage device to be rented to a user, a state of an electric storage device returned from a user, or the like. The information processing device 115 wirelessly communicates with the router device 120, for example, in accordance with the IEEE802.11 standard that is an international standard of wireless communication represented by wireless LAN (Local Area Network). The information processing device 115 communicates with the server device 131 of the management center 130 via the router device 120 and a network 180.

The inspection device 116 is a device that is used for inspection of a state of an electric storage device. Specifically, the inspection device 116 acquires identification information or the like of an electric storage device and transmits the identification information or the like to the information processing device 115. Then, the information processing device 115 acquires information indicative of the state of the electric storage device from the server device 131 on the basis of the identification information or the like of the electric storage device. Thus, the state of the electric storage device is inspected.

The card reader 117 is a device that reads out information of a membership card 119. For example, the card reader 117 reads out a user ID (user identifier) that is identification information of a user from the membership card 119 and transmits the user ID to the information processing device 115. The information processing device 115 causes a battery ID (battery identifier) that is identification information of an electric storage device and the user ID that is identification information of the user to be stored in the server device 131 in association with each other.

An electric storage device 118 is an example of an electric storage device of the present disclosure and is an electric storage device to be rented to a user or an electric storage device returned from a user. The electric storage device 118 is connected to the inspection device 116 and is inspected.

The membership card 119 is an IC card for identifying a user. For example, a user ID is stored in the membership card 119.

The router device 120 is a device that connects the information processing device 115 and the network 180.

The management center 130 collects and accumulates information indicative of a state of an electric storage device rented to a user. The server device 131 is installed in the management center 130.

The server device 131 is an example of a server device of the present disclosure and is a device that collects information indicative of a state of an electric storage device. Specifically, the server device 131 acquires information indicative of a state of an electric storage device by receiving the information indicative of the state of the electric storage device via an information terminal. Then, the server device 131 causes the information indicative of the state of the electric storage device to be stored in a storage device 132 of the server device 131. Furthermore, the server device 131 causes identification information of an electric storage device and identification information of a user to be stored in the storage device 132 of the server device 131 in association with each other.

The storage device 132 is a storage device in which information is stored. Specifically, information indicative of a state of an electric storage device is stored in the storage device 132. Furthermore, identification information of an electric storage device and identification information of a user are stored in the storage device 132 in association with each other. A database may be constructed in the storage device 132, and information may be stored as data of the database.

A house 140 is a house of a user of an electric storage device. A charging device 141, a router device 144, and the like are installed in the house 140.

The charging device 141 is a charger for charging an electric storage device. The charging device 141 charges an electric storage device by using electric power fed from an electric power system.

An electric storage device 142 is an example of an electric storage device of the present disclosure and is an electric storage device that has been rented to a user. In the example of FIG. 1, the electric storage device 142 is being charged by the charging device 141.

An information terminal 143 is an example of an information terminal of the present disclosure. The information terminal 143 may be a mobile terminal, may be a mobile phone, or may be a smartphone. In the example of FIG. 1, the information terminal 143 is an information terminal that the user of the electric storage device 142 owns. For example, the information terminal 143 acquires information indicative of a state of the electric storage device 142 on the basis of a user's operation. The information terminal 143 transmits the information indicative of the state of the electric storage device 142 to the server device 131 via the router device 144 and the network 180 on the basis of a user's operation.

For example, the information terminal 143 wirelessly communicates with the electric storage device 142 through near field communication in accordance with the IEEE802.15.1 standard that is an international standard of near field communication represented by Bluetooth (Registered Trademark). The information terminal 143 wirelessly communicates with the router device 144 in accordance with the IEEE802.11 standard that is an international standard of wireless communication.

The router device 144 is a device that connects the information terminal 143 and the network 180.

An electric bicycle 150 is an example of an electric mobile body of the present disclosure. The electric bicycle 150 may be an electric power-assisted bicycle. For example, the electric bicycle 150 moves by causing an electric motor 152 to operate by using electric power discharged by an electric storage device 151. In the electric bicycle 150, the electric storage device 151 may be charged by a regenerative brake or the like.

The electric storage device 151 is an example of an electric storage device of the present disclosure and is an electric storage device mounted in the electric bicycle 150. The electric storage device 151 feeds electric power to the electric motor 152 by discharging electric power. Furthermore, the electric storage device 151 is charged with electric power fed by a regenerative brake or the like.

The electric storage device 151 wirelessly communicates with an information terminal 153 through near field communication in accordance with the IEEE802.15.1 standard that is an international standard of near field communication. The electric storage device 151 transmits information indicative of a state of the electric storage device 151 to the information terminal 153.

The electric motor 152 is a motor that operates by electric power. For example, the electric motor 152 operates by electric power fed from the electric storage device 151. The electric bicycle 150 moves by causing the electric motor 152 to operate. The electric motor 152 may include a regenerative brake or the like.

The information terminal 153 is an example of an information terminal of the present disclosure. The information terminal 153 may be a mobile terminal, may be a mobile phone, or may be a smartphone. In the example of FIG. 1, the information terminal 153 is an information terminal that the user of the electric bicycle 150 owns. For example, the information terminal 153 acquires information indicative of a state of the electric storage device 151 when a user of the information terminal 153 uses the electric bicycle 150. The information terminal 153 transmits the information indicative of the state of the electric storage device 151 to the server device 131 over the network 180. This reduces occurrence of a situation where the user continues to use the electric storage device 151 without accumulation of a history of information indicative of the state of the electric storage device 151 in the server device 131.

For example, the information terminal 153 wirelessly communicates with the electric storage device 151 through near field communication in accordance with the IEEE802.15.1 standard that is an international standard of near field communication. The information terminal 153 wirelessly communicates with the server device 131 in accordance with a communication standard used in a mobile communication system such as the third generation mobile communication system (3G) or the fourth generation mobile communication system (4G).

The communication standard used in a mobile communication system may be IMT-2000, may be IMT-Advanced, or may be another communication standard. IMT-2000 is also expressed as International Mobile Telecommunications-2000. IMT-Advanced is also expressed as International Mobile Telecommunications-Advanced.

An electric scooter 160 is an example of an electric mobile body of the present disclosure. For example, the electric scooter 160 moves by causing an electric motor 163 to operate by using electric power discharged by electric storage devices 161 and 162. In the electric scooter 160, the electric storage devices 161 and 162 may be charged by a regenerative brake or the like.

Each of the electric storage devices 161 and 162 is an example of an electric storage device of the present disclosure and is an electric storage device mounted in the electric scooter 160. The role of each of the electric storage devices 161 and 162 mounted in the electric scooter 160 is the same as that of the electric storage device 151 mounted in the electric bicycle 150. The electric scooter 160 moves by larger power than the electric bicycle 150. For this reason, more electric storage devices (i.e., the electric storage devices 161 and 162) are used in the electric scooter 160 than in the electric bicycle 150 (i.e., the electric storage device 151).

An electric motor 163 is a motor that operates by electric power. The role of the electric motor 163 in the electric scooter 160 is the same as that of the electric motor 152 in the electric bicycle 150. The electric motor 163 of the electric scooter 160 generates larger power than the electric motor 152 of the electric bicycle 150.

An information terminal 164 is an example of an information terminal of the present disclosure. In the example of FIG. 1, the information terminal 164 is an information terminal that the user of electric scooter 160 owns. For example, the information terminal 164 acquires information indicative of states of the electric storage devices 161 and 162 when a user of the information terminal 164 uses the electric scooter 160. The information terminal 164 transmits the information indicative of the states of the electric storage devices 161 and 162 to the server device 131 over the network 180. This reduces occurrence of a situation where the user continues to use the electric storage devices 161 and 162 without accumulation of a history of information indicative of the states of the electric storage devices 161 and 162 in the server device 131. A specific operation of the information terminal 164 is the same as that of the information terminal 153.

An electric car 170 is an example of an electric mobile body of the present disclosure. The electric car 170 may be a hybrid car. For example, the electric car 170 moves by causing an electric motor 175 to operate by using electric power discharged by electric storage devices 171 through 174. In the electric car 170, the electric storage devices 171 through 174 may be charged by a regenerative brake or the like.

Each of the electric storage devices 171 through 174 is an example of an electric storage device of the present disclosure and is an electric storage device mounted in the electric car 170. The role of each of the electric storage devices 171 through 174 in the electric car 170 is the same as that of the electric storage device 151 in the electric bicycle 150. Since the electric car 170 moves by larger power, more electric storage devices (i.e., the electric storage devices 171 through 174) are used in the electric car 170.

The electric motor 175 is a motor that operates by electric power. The role of the electric motor 175 in the electric car 170 is the same as that of the electric motor 152 in the electric bicycle 150. The electric motor 175 generates larger power.

An information terminal 176 is an example of an information terminal of the present disclosure. In the example of FIG. 1, the information terminal 176 is an information terminal that a user of the electric car 170 owns.

For example, the information terminal 176 acquires information indicative of states of the electric storage devices 171 through 174 when the user of the information terminal 176 uses the electric car 170. The information terminal 176 transmits the information indicative of the states of the electric storage devices 171 through 174 to the server device 131 over the network 180. This reduces occurrence of a situation where the user continues to use the electric storage devices 171 through 174 without accumulation of a history of information indicative of the states of the electric storage devices 171 through 174 in the server device 131. A specific operation of the information terminal 176 is the same as that of the information terminal 153.

The network 180 is a communication network over which various communication devices communicate with each other. Specifically, the information terminals 143, 153, 164, and 176, the server device 131, and the like communicate with each other over the network 180. The network 180 is, for example, the Internet.

Figure 2:
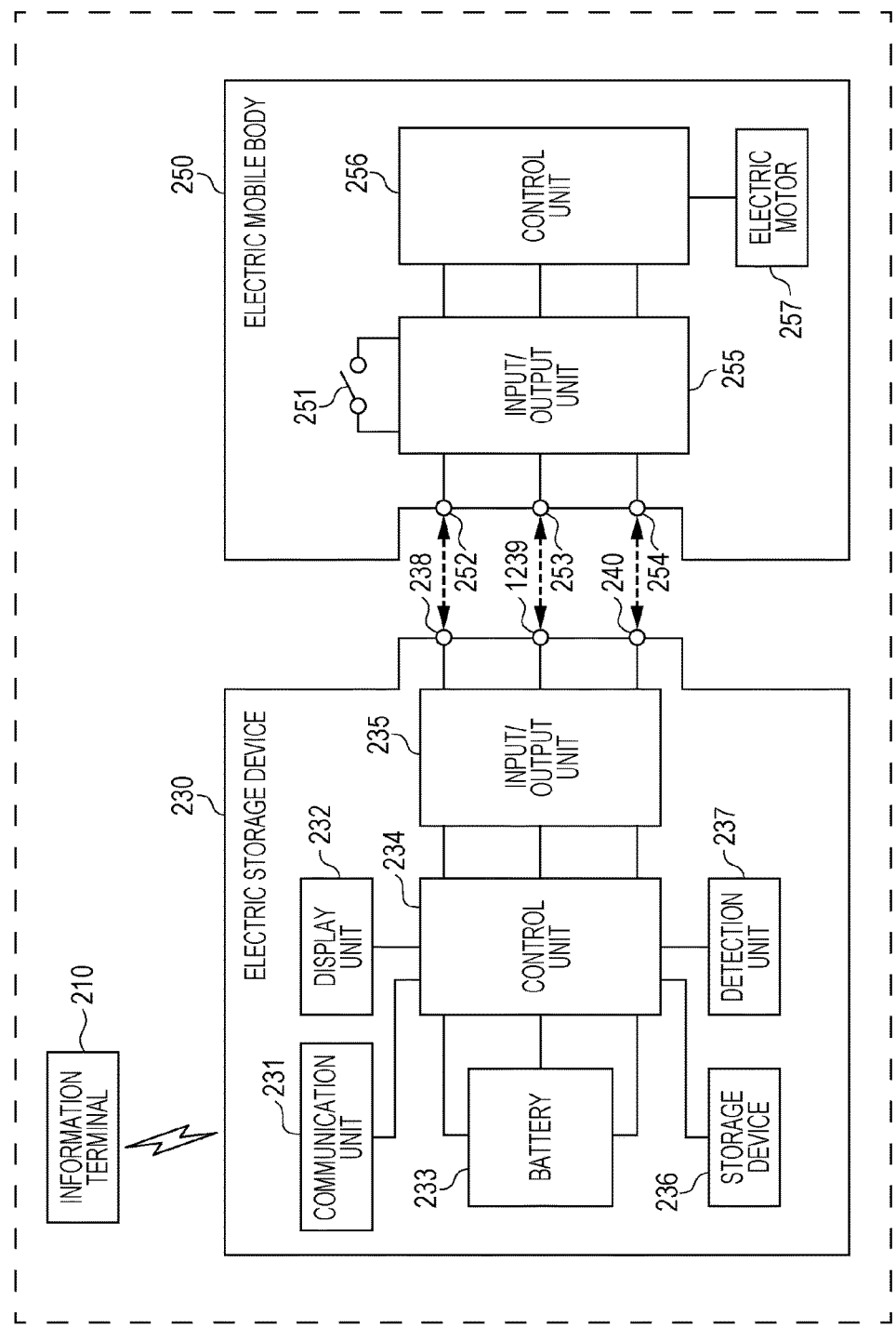
FIG. 2 is a block diagram illustrating a configuration of an electric storage device and a configuration of an electric mobile body in the embodiment.

FIG. 2 is a block diagram illustrating a configuration of an electric storage device and a configuration of an electric mobile body in the system environment illustrated in FIG. 1. In FIG. 2, an information terminal 210, an electric storage device 230, and an electric mobile body 250 are illustrated.

The information terminal 210 is an example of an information terminal of the present disclosure and corresponds to any one of the information terminal 143, 153, 164, and 176 illustrated in FIG. 1. The information terminal 210 may be a mobile terminal, may be a mobile phone, or may be a smartphone. The information terminal 210 is a terminal that a user of the information terminal 210 can carry.

The electric storage device 230 is an example of an electric storage device of the present disclosure and corresponds to any one of the electric storage devices 112 through 114, 118, 142, 151, 161, 162, and 171 through 174. The electric storage device 230 includes a communication unit 231, a display unit 232, a battery 233, a control unit 234, an input/output unit 235, a storage device 236, a detection unit 237, a positive terminal 238, a communication terminal 239, and a negative terminal 240.

The communication unit 231 is a communication unit for wirelessly communicating with the information terminal 210 through near field communication. For example, the communication unit 231 wirelessly communicates with the information terminal 210 through near field communication in accordance with the IEEE802.15.1 standard that is an international standard of near field communication. The communication unit 231 transmits information indicative of a state of the electric storage device 230 to the information terminal 210.

The display unit 232 is a display unit for displaying a state and the like of the electric storage device 230. The display unit 232 may be an indicator indicating whether or not the electric storage device 230 is operating.

The battery 233 is a battery for accumulating electric power therein. The battery 233 is charged with electric power fed into the electric storage device 230. Electric power discharged from the battery 233 is output from the electric storage device 230.

The control unit 234 is a control unit for controlling an operation of the electric storage device 230. The control unit 234 may include an arithmetic processor (not illustrated) and a storage device (not illustrated) in which a control program is stored. An example of the arithmetic processor is an MPU or a CPU. An example of the storage device is a memory. The storage device 236 may be used as the storage device in which a control program is stored. The control unit 234 may be made up of a single control unit that performs centralized control or may be made up of a plurality of control units that perform decentralized control in cooperation with one another.

The storage device 236 is a storage device in which information is stored. For example, information indicative of a state of the electric storage device 230 is stored in the storage device 236 by the control unit 234. The information indicative of the state of the electric storage device 230 may be accumulated in the storage device 236 as a history of a relatively short period such as two or three days. Alternatively, only the latest information indicative of a state of the electric storage device 230 may be stored in the storage device 236. Alternatively, a combination of the history and the latest information may be stored in the storage device 236.

The information indicative of the state of the electric storage device 230 is information indicative of a remaining battery level, the number of charges, the number of discharges, the total amount of charge, the total amount of discharge, a battery voltage, a battery temperature, a learning capacity, an abnormality, an impact, an FET (field effect transistor) temperature, a current operation state, and the like concerning the electric storage device 230. The information indicative of the state of the electric storage device 230 may be one or more of these pieces of information.

Furthermore, information indicative of a battery ID, a date of manufacture, and a manufacturer concerning the electric storage device 230 may be stored in the storage device 236. The information indicative of the state of the electric storage device 230 may include one or more of these pieces of information indicative of a battery ID, a date of manufacture, and a manufacturer.

The detection unit 237 is a detection unit for detecting the state of the electric storage device 230. The detection unit 237 detects, for example, a remaining battery level, the number of charges, the number of discharges, the total amount of charge, the total amount of discharge, a battery voltage, a battery temperature, a learning capacity, an abnormality, an impact, an FET (field effect transistor) temperature, a current operation state, and the like concerning the electric storage device 230. The detection unit 237 may include various sensors. For example, the control unit 234 causes the information indicative of the state detected by the detection unit 237 to be stored in the storage device 236.

The input/output unit 235 is an input/output unit for input and output of information and electric power. For example, the input/output unit 235 outputs information and electric power to the electric mobile body 250. The input/output unit 235 accepts input of information and electric power from the electric mobile body 250. The input/output unit 235 may include the positive terminal 238, the communication terminal 239, and the negative terminal 240.

The positive terminal 238 is a terminal corresponding to a positive electrode. The positive terminal 238 is connected to a positive terminal 252 of the electric mobile body 250. The positive terminal 238 may include a positive terminal for charge and a positive terminal for discharge separately.

The communication terminal 239 is a terminal for communication. For example, the communication terminal 239 is connected to a communication terminal 253 of the electric mobile body 250 in order to establish a transmission path between the electric storage device 230 and the electric mobile body 250. The communication terminal 239 may include a terminal for transmission and a terminal for reception separately. The communication terminal 239 may include an ID terminal for identifying a connection partner. Such an ID terminal may be provided in the electric storage device 230 separately from the communication terminal 239.

The negative terminal 240 is a terminal corresponding to a negative electrode. For example, the negative terminal 240 is connected to a negative terminal 254 of the electric mobile body 250. The negative terminal 240 is basically used for both charge and discharge of the electric storage device 230.

The electric mobile body 250 is an example of an electric mobile body of the present disclosure and corresponds to any one of the electric bicycle 150, the electric scooter 160, and the electric car 170 illustrated in FIG. 1. The electric mobile body 250 is electrically driven to move while carrying the user of the electric mobile body 250. The electric mobile body 250 includes a switch 251, the positive terminal 252, the communication terminal 253, the negative terminal 254, an input/output unit 255, a control unit 256, and an electric motor 257.

The switch 251 is a switch for accepting input of the user of the electric mobile body 250. For example, when the switch 251 is turned on by user's input, the electric mobile body 250 starts an operation. When the switch 251 is turned off by user's input, the electric mobile body 250 finishes the operation.

The positive terminal 252 is a terminal corresponding to a positive electrode. The positive terminal 252 is connected to the positive terminal 238 of the electric storage device 230. The positive terminal 252 may include a positive terminal for charge and a positive terminal for discharge separately.

The communication terminal 253 is a terminal for communication. For example, the communication terminal 253 is connected to the communication terminal 239 of the electric storage device 230 in order to establish a transmission path for communication between the electric storage device 230 and the electric mobile body 250. The communication terminal 253 may include a terminal for transmission and a terminal for reception. The communication terminal 253 may include an ID terminal for identifying a connection partner. Such an ID terminal may be provided in the electric mobile body 250 separately from the communication terminal 253.

The negative terminal 254 is a terminal corresponding to a negative electrode. For example, the negative terminal 254 is connected to a negative terminal 240 of the electric storage device 230. The negative terminal 254 is basically used for both charge and discharge of the electric storage device 230.

The input/output unit 255 is an input/output unit for input and output of information and electric power. For example, the input/output unit 255 outputs information and electric power to the electric storage device 230. The input/output unit 255 accepts input of information and electric power from the electric storage device 230. The input/output unit 255 may include the positive terminal 252, the communication terminal 253, and the negative terminal 254. The input/output unit 255 accepts user's input via the switch 251. The input/output unit 255 may include the switch 251.

The control unit 256 is a control unit for controlling an operation of the electric mobile body 250. The control unit 256 may include an arithmetic processor (not illustrated) and a storage device (not illustrated) in which a control program is stored. An example of the arithmetic processor is an MPU or a CPU. An example of the storage device is a memory. The control unit 256 may be made up of a single control unit that performs centralized control or may be made up of a plurality of control units that perform decentralized control in cooperation with one another.

The electric motor 257 is a motor that operates by electric power and corresponds to any one of the electric motors 152, 163, and 175 illustrated in FIG. 1. For example, the electric motor 257 operates by electric power fed from the electric storage device 230. The electric mobile body 250 moves by causing the electric motor 257 to operate. The electric motor 257 may include a regenerative brake or the like.

Figure 3:
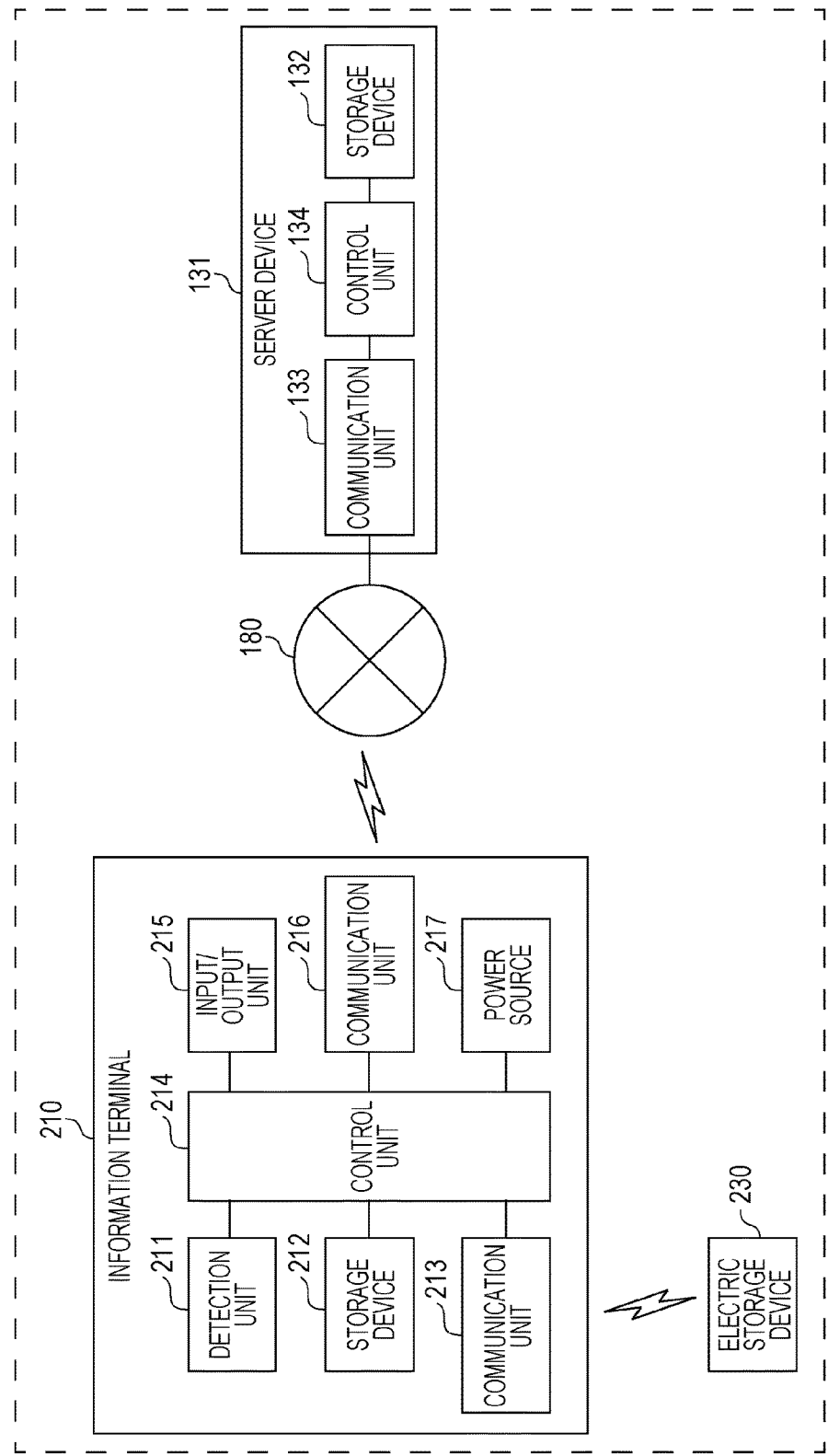
FIG. 3 is a block diagram illustrating a configuration of an information terminal and a configuration of a server device in the embodiment.

FIG. 3 is a block diagram illustrating a configuration of an information terminal and a configuration of a server device in the system environment illustrated in FIG. 1. In FIG. 3, the information terminal 210, the network 180, the server device 131, and the electric storage device 230 are illustrated.

As described above, the electric storage device 230 is an example of an electric storage device of the present disclosure and corresponds to any one of the electric storage devices 112 through 114, 118, 142, 151, 161, 162, and 171 through 174 illustrated in FIG. 1.

As described above, the information terminal 210 is an example of an information terminal of the present disclosure and corresponds to any one of the information terminals 143, 153, 164, and 176 illustrated in FIG. 1. The information terminal 210 may be a mobile terminal, a mobile phone, or may be a smartphone. The information terminal 210 includes a detection unit 211, a storage device 212, a communication unit 213, a control unit 214, an input/output unit 215, a communication unit 216, and a power source 217.

The detection unit 211 is a detection unit for detecting a state of the information terminal 210. The detection unit 211 may be a location sensor based on the GPS (Global Positioning System), may be a vibration sensor, may be an acceleration sensor, may be a geomagnetic sensor, or may be another sensor. For example, the detection unit 211 detects the location, vibration, acceleration, or the like of the information terminal 210.

The storage device 212 is a storage device in which information is stored. For example, information indicative of the state of the electric storage device 230 is stored in the storage device 212 via the communication unit 213, the control unit 214, and the like. The information indicative of the state of the electric storage device 230 may be accumulated as a history in the storage device 212. Alternatively, only the latest information indicative of the state of the electric storage device 230 may be stored in the storage device 212. Alternatively, a combination of the history and the latest information may be stored in the storage device 212.

Furthermore, a battery ID of the electric storage device 230, time and date of acquisition of the information indicative of the state of the electric storage device 230, and the like may be stored in the storage device 212 so as to be associated with the information indicative of the state of the electric storage device 230.

The communication unit 213 is an example of a first communicator of the present disclosure and is a communication unit for performing near field communication. Specifically, the communication unit 213 performs near field communication with the electric storage device 230. For example, the communication unit 213 wirelessly communicates with the electric storage device 230 through near field communication in accordance with the IEEE802.15.1 standard that is an international standard of near field communication. The communication unit 213 receives the information indicative of the state of the electric storage device 230, the battery ID of the electric storage device 230, and the like.

The control unit 214 is a control unit for controlling an operation of the information terminal 210. The control unit 214 may include an arithmetic processor (not illustrated) and a storage device (not illustrated) in which a control program is stored. An example of the arithmetic processor is an MPU or a CPU. An example of the storage device is a memory. The storage device 212 may be used as the storage device in which a control program is stored. The control unit 214 may be made up of a single control unit that performs centralized control or may be made up of a plurality of control units that perform decentralized control in cooperation with one another. Note that the control unit 214 is an example of a controller of the present disclosure.

For example, the control unit 214 acquires the information indicative of the state of the electric storage device 230 via the communication unit 213. The control unit 214 causes the information indicative of the state of the electric storage device 230 and time and date of acquisition of information, a battery ID of the electric storage device 230, a user ID of a user, positional information of the information terminal 210, the number of times of acquisition of information to be stored in the storage device 212 in association with each other. Then, the control unit 214 transmits these pieces of information to the server device 131 via the communication unit 216 and the like.

The information indicative of the state of the electric storage device 230 is thus transmitted from the electric storage device 230 to the server device 131.

The input/output unit 215 is a user interface for input and output of the information. For example, the input/output unit 215 notifies a user of information by outputting the information. Furthermore, the input/output unit 215 accepts user's input of information. The input/output unit 215 may include a display screen, a speaker, a microphone, a touch panel, an operation button, and the like.

The communication unit 216 is an example of a second communicator of the present disclosure and is a communication unit for wireless communication. The communication unit 216 may be, for example, a communication unit that performs wireless communication covering a longer communication distance than near field communication. The communication unit 216 is, for example, a communication unit for LTE (Registered Trademark).

Specifically, the communication unit 216 wirelessly communicates with the server device 131. For example, the communication unit 216 wirelessly communicates with the server device 131 in accordance with a communication standard used in a mobile communication system such as the third generation mobile communication system (3G) or the fourth generation mobile communication system (4G). More specifically, the communication unit 216 accesses a base station through wireless communication, is connected to the network 180 via the base station, and communicates with the server device 131 over the network 180.

Furthermore, for example, the communication unit 216 transmits the information indicative of the state of the electric storage device 230 to the server device 131 together with the time and date of acquisition of the information, the battery ID of the electric storage device 230, and the like under control of the control unit 214.

The power source 217 is a power source for feeding electric power to the constituent elements of the information terminal 210. The power source 217 may be a battery.

As described above, the network 180 is a communication network over which various communication devices communicate with one another and is, for example, the Internet.

As described above, the server device 131 is an example of a server device of the present disclosure and is a device that collects information indicative of the state of the electric storage device 230. The server device 131 includes a communication unit 133, a control unit 134, and the storage device 132. Note that electric power is fed to the server device 131 from an external electric power system (not illustrated).

The communication unit 133 is a communication unit for communication. For example, the communication unit 133 wirelessly communicates with the information terminal 210 over a mobile communication system such as the third generation mobile communication system (3G) or the fourth generation mobile communication system (4G). The communication unit 133 receives the information indicative of the state of the electric storage device 230, the time and date of acquisition of the information, the battery ID of the electric storage device 230, a user ID of a user, positional information, the number of times of acquisition, and the like from the information terminal 210.

The control unit 134 is a control unit for controlling an operation of the server device 131. The control unit 134 may include an arithmetic processor (not illustrated) and a storage device (not illustrated) in which a control program is stored. An example of the arithmetic processor is an MPU or a CPU. An example of the storage device is a memory. The storage device 132 may be used as the storage device in which a control program is stored. The control unit 134 may be made up of a single control unit that performs centralized control or may be made up of a plurality of control units that perform decentralized control in cooperation with one another.

For example, the control unit 134 acquires the information indicative of the state of the electric storage device 230 and the like from the information terminal 210 via the communication unit 133 and the like. Then, the control unit 134 causes the information indicative of the state of the electric storage device 230 and the like to be stored in the storage device 132. The control unit 134 may cause the information indicative of the state of the electric storage device 230 and the like to be accumulated as a history in the storage device 132. Alternatively, the control unit 134 may cause only the latest information indicative of the state of the electric storage device 230 to be stored in the storage device 132. Alternatively, the control unit 134 may cause a combination of the history and the latest information to be stored in the storage device 132.

The control unit 134 may cause the information indicative of the state of the electric storage device 230 and the like to be stored as data of a database in the storage device 132.

As described above, the storage device 132 is a storage device in which information is stored. Specifically, the information indicative of the state of the electric storage device 230 is stored in the storage device 132. The information indicative of the state of the electric storage device 230 may be accumulated in the storage device 132 as a history of a relatively long period such as one year or more. In this way, the information indicative of the state of the electric storage device 230 is collected, and the state of the electric storage device 230 is properly managed.

Figure 4:
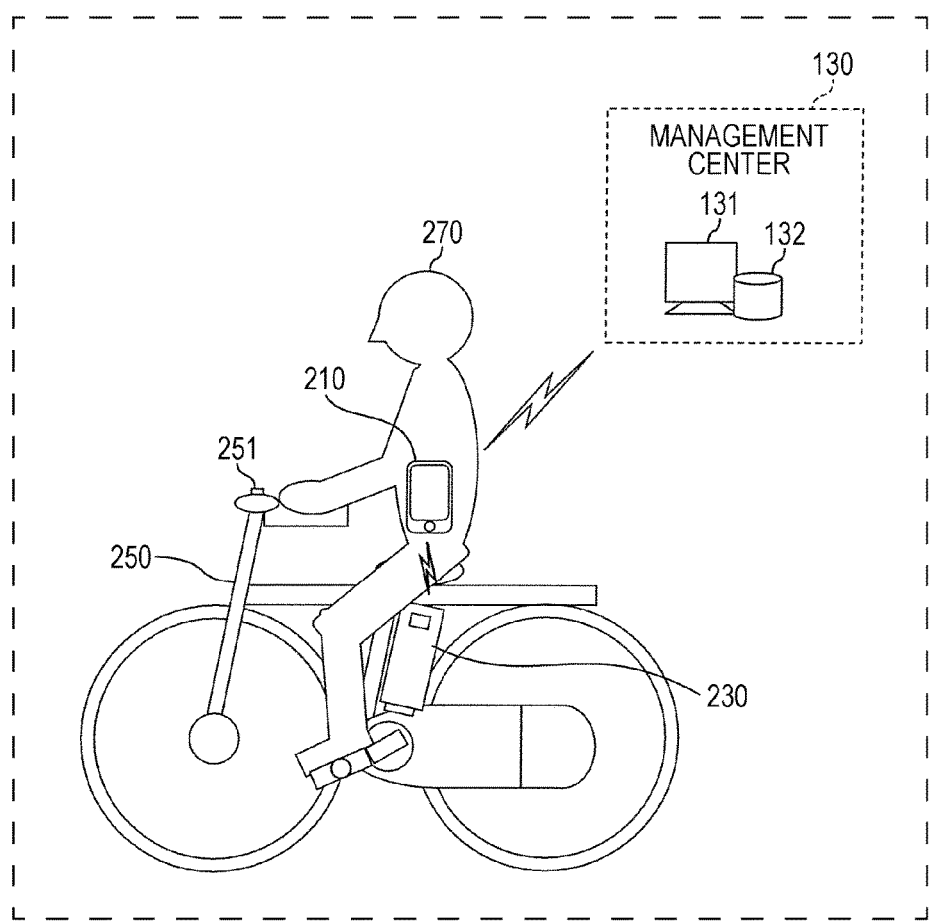
FIG. 4 is a schematic view illustrating communication in the embodiment.

FIG. 4 is a schematic view illustrating communication among the electric storage device 230, the information terminal 210, and the server device 131 illustrated in FIG. 3. In FIG. 4, a user 270, the information terminal 210, the switch 251, the electric mobile body 250, the electric storage device 230, the management center 130, the server device 131, and the storage device 132 are illustrated. The information terminal 210, the switch 251, the electric mobile body 250, the electric storage device 230, the management center 130, the server device 131, and the storage device 132 are the aforementioned constituent elements.

The user 270 is a user of the information terminal 210. The user 270 is also a user of both of the electric mobile body 250 and the electric storage device 230.

The information indicative of the state of the electric storage device 230 is transmitted from the electric storage device 230 to the server device 131 via the information terminal 210. Near field communication is used as communication between the electric storage device 230 and the information terminal 210, and wireless communication different from near field communication is used as communication between the information terminal 210 and the server device 131.

Even if the electric storage device 230 itself does not directly communicate with the server device 131, the information indicative of the state of the electric storage device 230 is transmitted from the electric storage device 230 to the server device 131 via the information terminal 210 that the user 270 owns.

The information indicative of the state of the electric storage device 230 is information indicative of a remaining battery level, the number of charges, the number of discharges, the total amount of charge, the total amount of discharge, a battery voltage, a battery temperature, a learning capacity, an abnormality, an impact, an FET temperature, a current operation state, and the like concerning the electric storage device 230. The information indicative of the state of the electric storage device 230 may include a battery ID of the electric storage device 230. Such information is transmitted from the electric storage device 230 to the information terminal 210.

Information transmitted from the information terminal 210 to the server device 131 may include time and date of acquisition of the information, a user ID of the user 270, the positional information of the information terminal 210, the number of times of acquisition of the information, and the like in addition to the information indicative of the state of the electric storage device 230.

Figure 5:
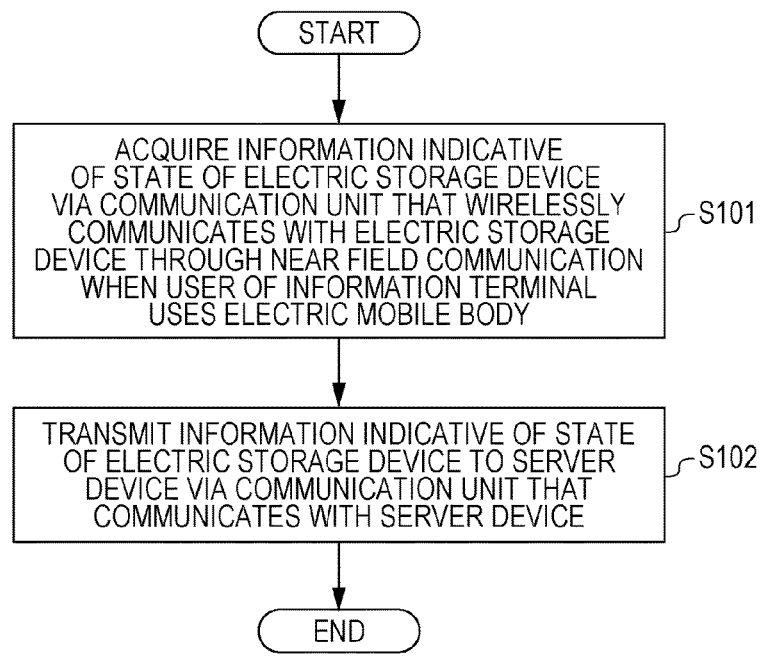
FIG. 5 is a flow chart illustrating an operation of the information terminal in the embodiment.

FIG. 5 is a flow chart illustrating an operation of the information terminal 210 illustrated, for example, in FIGS. 3 and 4.

First, the control unit 214 of the information terminal 210 acquires information indicative of the state of the electric storage device 230 via the communication unit 213 that wirelessly communicates with the electric storage device 230 through near field communication when the user 270 of the information terminal 210 uses the electric mobile body 250 (S101). Then, the control unit 214 of the information terminal 210 transmits the information indicative of the state of the electric storage device 230 to the server device 131 via the communication unit 216 that communicates with the server device 131 (S102).

The information indicative of the state of the electric storage device 230 is thus transmitted from the electric storage device 230 to the server device 131. This reduces occurrence of a situation where the user continues to use the electric storage device 230 without accumulation of a history of the information indicative of the state of the electric storage device 230 in the server device 131. Furthermore, the control unit 214 of the information terminal 210 acquires the information indicative of the state of the electric storage device 230 when the user 270 uses the electric mobile body 250. It can be assumed that when the user 270 uses the electric mobile body 250, the information terminal 210 that the user 270 owns and the electric storage device 230 mounted in the electric mobile body 250 are close to each other.

It can therefore be assumed that when the user 270 uses the electric mobile body 250, near field communication can be used between the information terminal 210 and the electric storage device 230. Therefore, the control unit 214 of the information terminal 210 can properly acquire the information indicative of the state of the electric storage device 230 through near field communication with the electric storage device 230 when the user 270 uses the electric mobile body 250.

When the user 270 uses the electric mobile body 250, the electric storage device 230 is used. Therefore, the control unit 214 of the information terminal 210 can acquire the information indicative of the state of the electric storage device 230 during use of the electric storage device 230 since the information indicative of the state of the electric storage device 230 is acquired when the user 270 uses the electric mobile body 250. This makes it possible to check, for example, the presence or absence of an abnormality during use of the electric storage device 230.

Note that the time when the user 270 uses the electric mobile body 250 includes timings at the start of use, during use, and the end of use of the electric mobile body 250. The control unit 214 of the information terminal 210 may acquire the information indicative of the state of the electric storage device 230 at all of these timings or may acquire the information indicative of the state of the electric storage device 230 at any of these timings.

FIG. 6 is an explanatory view for explaining criteria on which a use state of the electric mobile body 250 illustrated, for example, in FIG. 4 is determined. FIG. 6 illustrates "start of use", "during use", and "end of use" as use states. As described above, the control unit 214 of the information terminal 210 may acquire information indicative of the state of the electric storage device 230 in these use states.

Furthermore, FIG. 6 illustrates criteria on which the use state is determined. For example, the electric storage device 230 determines whether or not the use state of the electric mobile body 250 is any of "start of use", "during use", and "end of use" in accordance with these criteria, and in a case where it is determined that the use state of the electric mobile body 250 is "start of use", "during use", or "end of use", information indicative of the state of the electric storage device 230 is transmitted to the information terminal 210.

Specifically, the control unit 234 of the electric storage device 230 determines that use of the electric mobile body 250 has been started when the switch 251 of the electric mobile body 250 is turned on. Note that the control unit 234 of the electric storage device 230 can recognize that the switch 251 of the electric mobile body 250 has been turned on by communicating with the electric mobile body 250.

The control unit 234 of the electric storage device 230 determines that the electric mobile body 250 is being used when the switch 251 of the electric mobile body 250 is on. The control unit 234 of the electric storage device 230 determines that use of the electric mobile body 250 has been finished when the switch 251 of the electric mobile body 250 is turned off.

Furthermore, the control unit 234 of the electric storage device 230 determines that use of the electric mobile body 250 has been started when a load electric current of the electric storage device 230 becomes higher than a predetermined value. The load electric current of the electric storage device 230 is an electric current output by the electric storage device 230. The predetermined value is, for example, 0. The control unit 234 may detect the load electric current of the electric storage device 230 by using the detection unit 237 of the electric storage device 230.

The control unit 234 of the electric storage device 230 determines that the electric mobile body 250 is being used when the load electric current of the electric storage device 230 is higher than the predetermined value. The control unit 234 of the electric storage device 230 determines that use of the electric mobile body 250 has been finished when the load electric current of the electric storage device 230 becomes equal to or lower than the predetermined value.

Furthermore, the control unit 234 of the electric storage device 230 determines that use of the electric mobile body 250 has been started when continuous vibration is started in the electric storage device 230. The control unit 234 may detect continuous vibration by using the detection unit 237 of the electric storage device 230.

The control unit 234 of the electric storage device 230 determines that the electric mobile body 250 is being used when continuous vibration is being maintained in the electric storage device 230. The control unit 234 of the electric storage device 230 determines that use of the electric mobile body 250 has been finished when continuous vibration is ended in the electric storage device 230.

Furthermore, the control unit 234 of the electric storage device 230 determines that use of the electric mobile body 250 has been started when a remaining battery level in the electric storage device 230 starts to decrease. The control unit 234 may detect a decrease in remaining battery level by using the detection unit 237 of the electric storage device 230.

The control unit 234 of the electric storage device 230 determines that the electric mobile body 250 is being used when the remaining battery level in the electric storage device 230 is decreasing. The control unit 234 of the electric storage device 230 determines that use of the electric mobile body 250 has been finished when the remaining battery level in the electric storage device 230 stops decreasing.

The control unit 234 of the electric storage device 230 may determine a proper use state by using any one of the plurality of criteria described above or may determine a proper use state by using a combination of the plurality of criteria described above. The control unit 234 of the electric storage device 230 transmits, to the information terminal 210, information indicative of the state of the electric storage device 230 at at least any one of timings at the start of use, during use, and at the end of use.

Figure 9:
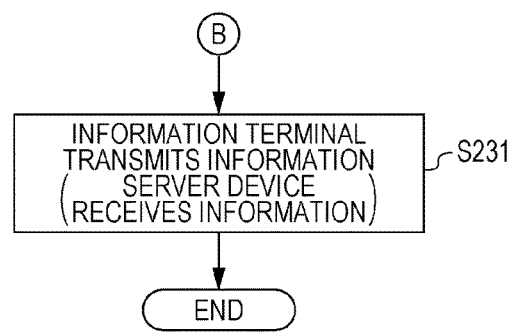
FIG. 9 is a flow chart illustrating operations at the time of the end of use in the embodiment.

FIGS. 7 through 9 illustrate an example of operations of the information terminal 210, the electric storage device 230, and the server device 131 illustrated, for example, in FIG. 4 at the start of use, during use, and at the end of use of the electric mobile body 250, respectively.

FIG. 7 is a flow chart illustrating operations at the start of use of the electric mobile body 250 illustrated, for example, in FIG. 4.

First, the control unit 234 of the electric storage device 230 determines whether or not the switch 251 of the electric mobile body 250 is on (S211). Furthermore, the control unit 234 of the electric storage device 230 determines whether or not the load electric current of the electric storage device 230 is higher than the predetermined value (S212). Furthermore, the control unit 234 of the electric storage device 230 determines whether or not there is continuous vibration (S213). The control unit 234 of the electric storage device 230 repeats these determining processes until results in all of these steps (S211, S212, and S213) become Yes.

When the results in all of these steps (S211, S212, and S213) become Yes, the control unit 234 of the electric storage device 230 determines that use of the electric mobile body 250 has been started. At the start of use of the electric mobile body 250, the control unit 234 of the electric storage device 230 transmits information indicative of the state of the electric storage device 230 to the information terminal 210 via the communication unit 231 through near field communication with the information terminal 210 (S214).

The control unit 214 of the information terminal 210 receives the information indicative of the state of the electric storage device 230 from the electric storage device 230 via the communication unit 213 through near field communication with the electric storage device 230. That is, at the start of use of the electric mobile body 250, the control unit 214 of the information terminal 210 acquires the information indicative of the state of the electric storage device 230 via the communication unit 213.

Then, the control unit 214 of the information terminal 210 transmits the information indicative of the state of the electric storage device 230 to the server device 131 via the communication unit 216 through wireless communication with the server device 131 (S215). The control unit 134 of the server device 131 receives the information indicative of the state of the electric storage device 230 from the information terminal 210 via the communication unit 133 by communicating with the information terminal 210.

In this way, the information indicative of the state of the electric storage device 230 is collected at the time of the start of use of the electric mobile body 250. That is, the information indicative of the state of the electric storage device 230 is collected at the time of the start of use of the electric storage device 230.

FIG. 8 is a flow chart illustrating operations during use of the electric mobile body 250 illustrated, for example, in FIG. 4. That is, FIG. 8 illustrates continuation from the operations of FIG. 7.

After the start of use of the electric mobile body 250, the control unit 234 of the electric storage device 230 waits for a predetermined period after transmission of the information indicative of the state of the electric storage device 230 to the information terminal 210 (S221).

Then, the control unit 234 of the electric storage device 230 determines whether or not the switch 251 of the electric mobile body 250 is on (S222). Furthermore, the control unit 234 of the electric storage device 230 determines whether or not the load electric current of the electric storage device 230 is higher than the predetermined value (S223). Furthermore, the control unit 234 of the electric storage device 230 determines whether or not there is continuous vibration (S224).

In a case where results in all of these steps (S222, S223, and S224) are Yes, the control unit 234 of the electric storage device 230 determines that use of the electric mobile body 250 is being continued. Then, the control unit 234 of the electric storage device 230 transmits the information indicative of the state of the electric storage device 230 to the information terminal 210 via the communication unit 231 through near field communication with the information terminal 210 (S225).

The control unit 214 of the information terminal 210 receives the information indicative of the state of the electric storage device 230 from the electric storage device 230 via the communication unit 213 through near field communication with the electric storage device 230. That is, during use of the electric mobile body 250, the control unit 214 of the information terminal 210 acquires the information indicative of the state of the electric storage device 230 via the communication unit 213.

Then, the control unit 234 of the electric storage device 230 waits for a predetermined period after transmission of the information indicative of the state of the electric storage device 230 to the information terminal 210 again (S221).

Meanwhile, in a case where a result in at least one of the steps (S222, S223, and S224) in which it is determined whether or not use of the electric mobile body 250 is being continued is No, the control unit 234 of the electric storage device 230 determines that use of the electric mobile body 250 has been finished. Then, operations at the end of use that will be described later are performed.

Through the above operations, during use of the electric mobile body 250, the control unit 214 of the information terminal 210 periodically acquires the information indicative of the state of the electric storage device 230 via the communication unit 213.

FIG. 9 is a flow chart illustrating operations at the time of the end of use of the electric mobile body 250 illustrated, for example, in FIG. 4. That is, FIG. 9 illustrates continuation of the operations of FIG. 8.

At the time of the end of use of the electric mobile body 250, the control unit 214 of the information terminal 210 transmits the information indicative of the state of the electric storage device 230 to the server device 131 via the communication unit 216 through wireless communication with the server device 131 (S231). The control unit 134 of the server device 131 receives the information indicative of the state of the electric storage device 230 from the information terminal 210 via the communication unit 133 by communicating with the information terminal 210.

In this way, the information that is periodically acquired from the electric storage device 230 by the information terminal 210 during use of the electric mobile body 250 is transmitted from the information terminal 210 to the server device 131 at the time of the end of use of the electric mobile body 250. It is therefore possible to collect the information indicative of the state of the electric storage device 230 that is being used while suppressing an increase in communication traffic.

Note that information acquired at a point in time closest to the time of the end of use of the electric mobile body 250 among pieces of information periodically acquired during use of the electric mobile body 250, i.e., information acquired last may be transmitted to the server device 131 after the end of use of the electric mobile body 250.

The operations illustrated in FIGS. 7 through 9 are an example, and the operations of the information terminal 210, the electric storage device 230, and the server device 131 are not limited to the ones illustrated in FIGS. 7 through 9. During use, the information transmitted from the electric storage device 230 to the information terminal 210 may be transmitted from the information terminal 210 to the server device 131 as needed. At the time of the end of use, the information indicative of the state of the electric storage device 230 may be acquired from the electric storage device 230 and transmitted to the server device 131.

In FIGS. 7 through 9, the electric storage device 230 determines whether or not the electric mobile body 250 has been used, and in a case where it is determined that the electric mobile body 250 has been used, the information indicative of the state of the electric storage device 230 is transmitted to the information terminal 210. By acquiring the information thus transmitted, the information terminal 210 can acquire the information indicative of the state of the electric storage device 230 when the electric mobile body 250 is used. Instead of such an example, the information terminal 210 may estimate whether or not the electric mobile body 250 has been used on the basis of positional information or the like.

Figure 10:
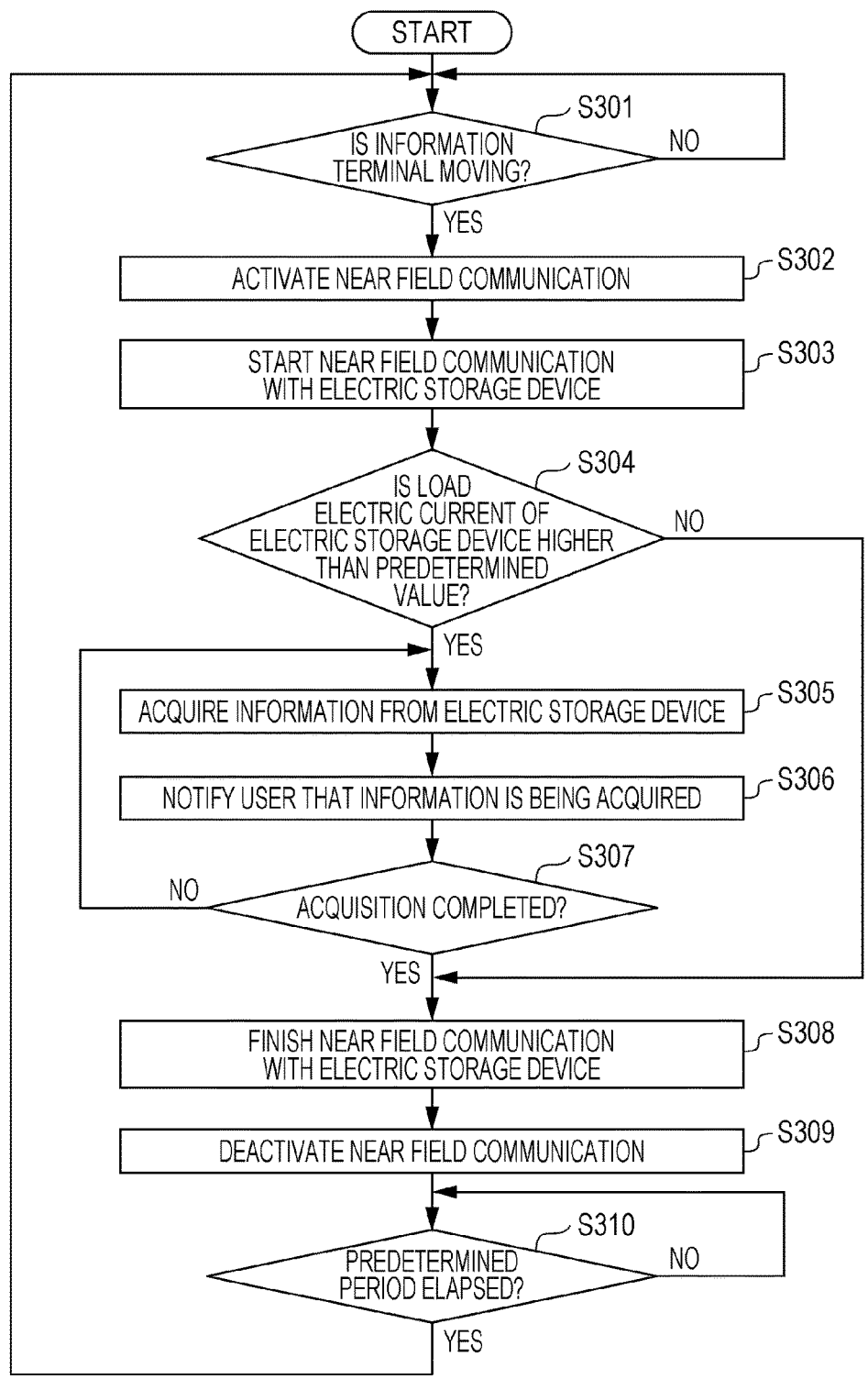
FIG. 10 is a flow chart illustrating a first modification of the operation of the information terminal in the embodiment.

FIG. 10 is a flow chart illustrating a first modification of the operation of the information terminal 210 illustrated, for example, in FIG. 4.

First, the control unit 214 of the information terminal 210 determines whether or not the information terminal 210 is moving by using the detection unit 211 (S301). In this way, whether or not the electric mobile body 250 has been used is estimated. For example, the control unit 214 of the information terminal 210 may determine whether or not the information terminal 210 is moving at a speed higher than a predetermined speed. The predetermined speed is, for example, an average walking speed. The control unit 214 of the information terminal 210 repeats the process of determining whether or not the information terminal 210 is moving until it is determined that the information terminal 210 is moving.

In a case where the information terminal 210 is moving, the control unit 214 of the information terminal 210 activates near field communication (S302). That is, the control unit 214 of the information terminal 210 permits the communication unit 213 of the information terminal 210 to perform near field communication. Then, the control unit 214 of the information terminal 210 starts near field communication with the electric storage device 230 via the communication unit 213 (S303).

Then, the control unit 214 of the information terminal 210 determines whether or not the load electric current of the electric storage device 230 is higher than the predetermined value via the communication unit 213 (S304). In this way, it is confirmed that the electric mobile body 250 has been used.

In a case where the load electric current of the electric storage device 230 is higher than the predetermined value (Yes in S304), the control unit 214 of the information terminal 210 acquires the information indicative of the state of the electric storage device 230 from the electric storage device 230 via the communication unit 213 (S305). The control unit 214 of the information terminal 210 notifies the user 270 of the information terminal 210 that the information indicative of the state of the electric storage device 230 is being acquired by the information terminal 210 by using the input/output unit 215 (S306).

For example, the control unit 214 of the information terminal 210 notifies the user 270 of the information terminal 210 that the information is being acquired by the information terminal 210 by displaying information indicating that the information is being acquired by the information terminal 210 on a display screen of the input/output unit 215 of the information terminal 210. The control unit 214 of the information terminal 210 may notify the user 270 of the information terminal 210 that the information is being acquired by the information terminal 210 by outputting sound. This allows the user 270 to recognize that the state of the electric storage device 230 is properly managed.

The control unit 214 of the information terminal 210 may notify the server device 131 or another device that the information is being acquired by the information terminal 210 through communication using the communication unit 216 and the like.

Then, the control unit 214 of the information terminal 210 continues acquisition of the information indicative of the state of the electric storage device 230 (S305) and notification (S306) until acquisition of the information indicative of the state of the electric storage device 230 is completed (S307).

In a case where acquisition of the information indicative of the state of the electric storage device 230 is completed (Yes in S307) or in a case where the load electric current of the electric storage device 230 is equal to or lower than the predetermined value (No in S304), the control unit 214 of the information terminal 210 finishes the near field communication with the electric storage device 230 (S308). Then, the control unit 214 of the information terminal 210 deactivates the near field communication (S309). That is, the control unit 214 of the information terminal 210 prohibits the communication unit 213 of the information terminal 210 from performing near field communication.

Then, the control unit 214 of the information terminal 210 waits for a predetermined period after deactivation of the near field communication (S310). Then, the control unit 214 of the information terminal 210 repeats the processes starting from determination as to whether or not the information terminal 210 is moving.

Through the above operation, the information terminal 210 can acquire the information indicative of the state of the electric storage device 230 when the electric mobile body 250 is used.

Note that part of the operation illustrated in FIG. 10 may be omitted. In particular, the process for activating or deactivating the near field communication (S302, S309), the process for determining whether or not the load electric current is higher than the predetermined value (S304), and the process for notifying the user 270 of the information terminal 210 that the information is being acquired by the information terminal 210 (S306) may be omitted.

For example, near field communication may be always activated. In this case, the process for activating or deactivating the near field communication (S302, S309) is omitted. Furthermore, it may be determined that the electric mobile body 250 is being used in a case where it is determined that the information terminal 210 is moving. In this case, the process for determining whether or not the load electric current is higher than the predetermined value (S304) is omitted, and the information indicative of the state of the electric storage device 230 is acquired without determining whether or not the load electric current is higher than the predetermined value (S305).

In the operation illustrated in FIG. 10, the user 270 of the information terminal 210 is notified that the information indicative of the state of the electric storage device 230 is being acquired by the information terminal 210. However, the user 270 of the information terminal 210 may be notified that the information indicative of the state of the electric storage device 230 is not being acquired by the information terminal 210. For example, notification different from the notification indicating that the information indicative of the state of the electric storage device 230 is being acquired may be given in a case where the information terminal 210 is unable to perform near field communication with the electric storage device 230.

FIG. 11 is an explanatory view for explaining criteria on which it is determined whether or not the information terminal 210 illustrated, for example, in FIG. 4 is moving. Specifically, FIG. 11 illustrates criteria in the process of determining whether or not the information terminal 210 is moving (S301) illustrated in FIG. 10.

The control unit 214 of the information terminal 210 determines whether or not the information terminal 210 is moving in order to estimate whether or not the electric mobile body 250 has been used. In this process, the control unit 214 of the information terminal 210 uses the detection unit 211 of the information terminal 210. A method for determining whether or not the information terminal 210 is moving varies depending on the type of the detection unit 211 of the information terminal 210.

For example, in a case where the detection unit 211 of the information terminal 210 is a location sensor based on the GPS, the control unit 214 of the information terminal 210 determines whether or not the information terminal 210 is moving on the basis of continuous movement of the location. Specifically, the control unit 214 of the information terminal 210 determines that the information terminal 210 is moving in a case where the location detected by the location sensor based on the GPS is continuously moving.

Meanwhile, in a case where the detection unit 211 of the information terminal 210 is a vibration sensor, the control unit 214 of the information terminal 210 determines whether or not the information terminal 210 is moving on the basis of continuous vibration. Specifically, the control unit 214 of the information terminal 210 determines that the information terminal 210 is moving in a case where the vibration sensor detects continuous vibration.

Meanwhile, in a case where the detection unit 211 of the information terminal 210 is an acceleration sensor, the control unit 214 of the information terminal 210 determines whether or not the information terminal 210 is moving on the basis of a continuous change of acceleration. Specifically, the control unit 214 of the information terminal 210 determines that the information terminal 210 is moving in a case where the acceleration detected by the acceleration sensor is continuously changing.

Meanwhile, in a case where the detection unit 211 of the information terminal 210 is a geomagnetic sensor, the control unit 214 of the information terminal 210 determines whether or not the information terminal 210 is moving on the basis of continuous movement of the location. Specifically, the control unit 214 of the information terminal 210 determines that the information terminal 210 is moving in a case where the location detected by the geomagnetic sensor is continuously moving.

Meanwhile, in a case where the detection unit 211 of the information terminal 210 is a combination of the aforementioned plurality of sensors, the control unit 214 of the information terminal 210 may determine whether or not the information terminal 210 is moving on the basis of a combination of the aforementioned plurality of criteria. Alternatively, the control unit 214 of the information terminal 210 may determine whether or not the information terminal 210 is moving on the basis of one of the aforementioned plurality of criteria.

Figure 12:
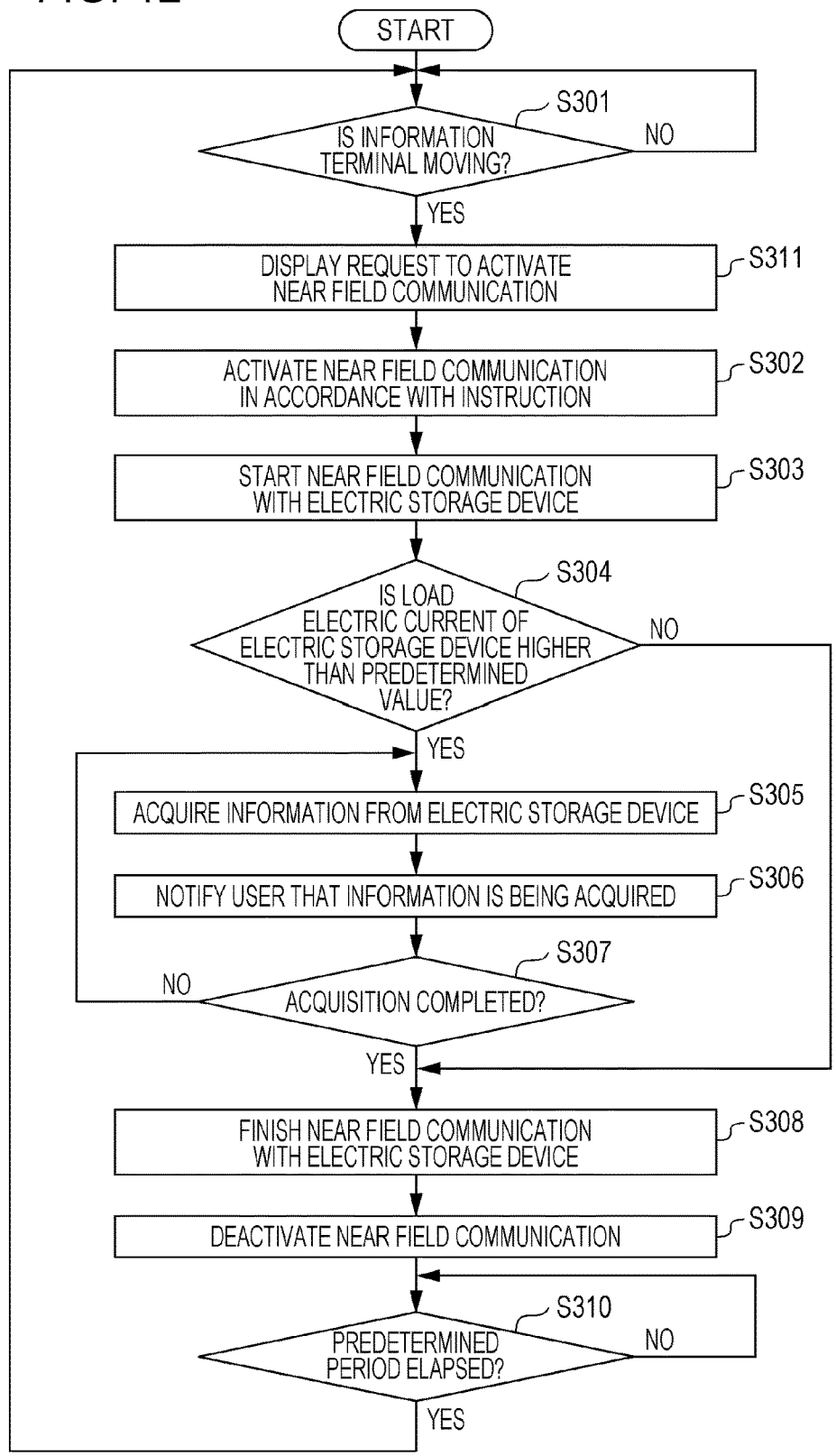
FIG. 12 is a flow chart illustrating a second modification of the operation of the information terminal in the embodiment.

FIG. 12 is a flow chart illustrating a second modification of the operation of the information terminal 210 illustrated, for example, in FIG. 4. The example illustrated in FIG. 12 is almost the same as the example illustrated in FIG. 10, but a process for displaying a request to activate near field communication (S311) is added in the example illustrated in FIG. 12. Differences from the example illustrated in FIG. 10 are described below.

The control unit 214 of the information terminal 210 displays a request to activate near field communication on the display screen of the input/output unit 215 of the information terminal 210 in a case where the information terminal 210 is moving (S311). That is, the control unit 214 of the information terminal 210 prompts the user 270 of the information terminal 210 to give an instruction to activate near field communication.

For example, the user 270 of the information terminal 210 inputs an instruction to activate near field communication into the input/output unit 215 of the information terminal 210 in accordance with the displayed request. The control unit 214 of the information terminal 210 activates near field communication in accordance with the instruction (S302).

This allows the information terminal 210 to properly activate near field communication in accordance with the instruction of the information terminal 210.

Figure 13:
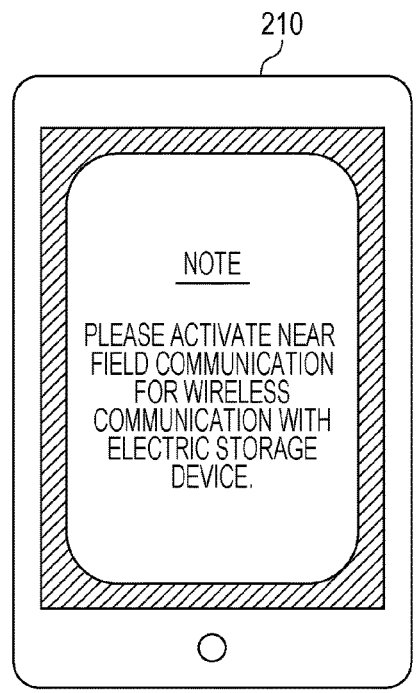
FIG. 13 is a schematic view illustrating an example of a displayed request to activate near field communication in the embodiment.

FIG. 13 is a schematic view illustrating an example of a displayed request to activate near field communication of the information terminal 210 illustrated, for example, in FIG. 4. That is, FIG. 13 illustrates a request displayed on the display screen of the information terminal 210 in the process for displaying a request to activate near field communication (S311 in FIG. 12). For example, the user 270 of the information terminal 210 inputs an instruction to activate near field communication into the information terminal 210 in accordance with the displayed request illustrated in FIG. 13.

This makes it possible to perform near field communication between the information terminal 210 and the electric storage device 230, thereby making it possible to transmit the information indicative of the state of the electric storage device 230 from the electric storage device 230 to the server device 131 via the information terminal 210. Note that the process for displaying the request to activate near field communication (S311) is performed when it is determined for the first time that the information terminal 210 is moving, and this process may be omitted thereafter.

As described above, the method for controlling an information terminal, the information terminal, and the like of the present embodiment reduce occurrence of a situation where a user continues to use an electric storage device without accumulation of a history of information indicative of the state of the electric storage device in a server device. It is therefore possible to properly manage the state of the electric storage device.

In the above embodiment, each of the constituent elements may be realized by special hardware or may be realized by execution of a software program suitable for the constituent element. Each of the constituent elements may be realized in a manner such that a program executer such as a CPU or a processor reads out and then executes a software program stored in a recording medium such as a hard disc or a semiconductor memory. Software for realizing the information terminal and the like of the above embodiment is the following program.

That is, this program causes a computer or the like in an information terminal to execute a method for controlling the information terminal including acquiring information indicative of a state of an electric storage device mounted in an electric mobile body via a first communicator that is a communicator of the information terminal and that performs near field communication with the electric storage device when a user of the information terminal uses the electric mobile body; and transmitting the information indicative of the state of the electric storage device to a server device via a second communicator that is a communicator of the information terminal and that communicates with the server device.

In the above embodiment, each of the constituent elements may be a circuit. A plurality of constituent elements may constitute a single circuit as a whole or may constitute respective different circuits. The circuit may be a general-purpose circuit or may be a special circuit.

The communication standards described above are examples, and other communication standards may be used.

A method for controlling an information terminal according to one or more aspects has been described above on the basis of the embodiment, but the present disclosure is not limited to this embodiment. Various modifications of the present embodiment which a person skilled in the art can conceive of and combinations of constituent elements in difference embodiments may be also encompassed within the scope of the one or more aspects without departing from the scope of the present disclosure.

For example, in the above embodiment, a process executed by a specific constituent element may be executed by another constituent element instead of the specific constituent element. Furthermore, the order of a plurality of processes may be changed, and a plurality of processes may be performed in parallel.

The present disclosure can be used as a method for controlling an information terminal, an information terminal, and the like and is applicable to a system for renting an electric storage device, a system for managing an electric storage device, and the like.

What is claimed is:

1. A method comprising:
    starting, using a first communicator included in an information terminal, a near field communication with a second communicator included in an electric storage device, the electric storage device being mounted on an electric vehicle;
    when the first communicator and the second communicator are within the near field communication range in order to use the electric vehicle, determining, using sensors of the electric vehicle, a state of electric vehicle movement;
    based on the determined state of the electric vehicle movement, acquiring, from the electric storage device by the information terminal via the near field communication between the first communicator and the second communicator, information indicative of a state of the electric storage device;
    when the first communicator and the second communicator are within the near field communication range without order to start using the electric vehicle without the electric vehicle being activated, the information indicative of the state of the electric storage device is not collected;
    when the information indicative of the state of the electric storage device is acquired, transmitting, from the information terminal to a server device via a third communicator included in the information terminal, the information indicative of the state of the electric storage device,
    determining if the electric current load of the electric storage device is higher than a predetermined value;
    in response to the determining that the electric current load of the electric storage device is higher than the predetermined value
        transmitting the state information of the electric storage device from the second communicator included in the electric storage device to the first communicator of the information terminal, and
        acquiring of the state information of the electric storage device by the information terminal.

2. The method according to claim 1, wherein
    in the acquiring, the information indicative of the state of the electric storage device is acquired at a time of start of use of the electric vehicle.

3. The method according to claim 1, wherein
    in the acquiring, the information indicative of the state of the electric storage device is acquired at a time of end of use of the electric vehicle.

4. The method according to claim 1, further comprising:
    displaying, on a display screen of the information terminal, a notification indicating that the information indicative of the state of the electric storage device is being acquired.

5. The method according to claim 1, wherein
    in the acquiring, the information indicative of the state of the electric storage device is regularly acquired during use of the electric vehicle; and
    among the information regularly acquired, information acquired at a point in time nearest to end of use of the electric vehicle is transmitted to the server device via the third communicator after the end of use of the electric vehicle.

6. The method according to claim 1, further comprising:
    activating the near field communication between the information terminal and the electric storage device when the electric vehicle is detected as being in use.

7. The method according to claim 6, further comprising:
    deactivating the near field communication between the information terminal and the electric storage device, even when the information terminal is within a near field communication range of the electric storage device, after the information indicative of the state of the electric storage device is acquired.

8. The method according to claim 1, further comprising:
    displaying, on a display screen of the information terminal, a message that requests activation of the near field communication with the electric storage device when the electric vehicle is in use; and
    activating, using the information terminal, the near field communication between the information terminal and the electric storage device.

9. A non-transitory computer-readable recording medium storing a program for causing the information terminal to execute the method according to claim 1.

10. The method according to claim 1, wherein the electric storage device includes a rechargeable battery.

11. The method according to claim 1, wherein the information terminal is a mobile terminal that is separate from the electric vehicle.

12. The method according to claim 1, further comprising:
    activating the near field communication between the information terminal and the electric storage device when the information terminal detects that the mobile terminal is within a near field communication range of the electric storage device.

13. The method according to claim 1, further comprising:
    activating the near field communication between the information terminal and the electric storage device when the information terminal detects a movement of the electric vehicle.

14. The method according to claim 1, wherein the transmitting is performed at an end of use of the vehicle.

15. The method according to claim 1, wherein the state of electric vehicle movement includes a particular type of movement of the electric vehicle based on a movement of the electric vehicle.

16. The method according to claim 1, further comprising:
    determining if acquisition of the state information of the electric storage device by the information terminal is completed; and deactivating near field communication between the first and second communicators in response to determining that acquisition of the state information of the electric storage device by the information terminal is completed.

17. The information terminal according to claim 1, wherein the controller further:
   determines if acquisition of the state information of the electric storage device by the information terminal is completed; and
   deactivates near field communication between the first and second communicators in response to determining that acquisition of the state information of the electric storage device by the information terminal is completed.

18. An information terminal comprising:
   a first communicator that starts to perform near field communication with a communicator included in an electric storage device;
   a second communicator that communicates with a server device; and
   a controller that, when the first communicator and the second communicator are within the near field communication range in order to use the electric vehicle,
      determines, using information provided by sensors of the electric vehicle, a state of electric vehicle movement;
      based on the determined state of the electric vehicle movement, acquires, from the electric storage device via the near field communication between the first communicator and the communicator included in the electric storage device, information indicative of a state of the electric storage device,
   controls the second communicator to transmit the information indicative of the state of the electric storage device to the server device,
   when the first communicator and the second communicator are within the near field communication range without order to start using the electric vehicle without the electric vehicle being activated, does not acquire, from the electric storage device via the near field communication between the first communicator and the communicator included in the electric storage device, information indicative of a state of the electric storage device,
   determines if the electric current load of the electric storage device is higher than a predetermined value; and
   in response to the determining that the electric current load of the electric storage device is higher than the predetermined value
      transmits the state information of the electric storage device from the second communicator included in the electric storage device to the first communicator of the information terminal, and
      acquires of the state information of the electric storage device by the information terminal.

* * * * *